United States Patent [19]

Yoshizawa

[11] Patent Number: 5,040,838
[45] Date of Patent: Aug. 20, 1991

[54] WINDSHIELD FOR AUTOMOBILES

[75] Inventor: Hideo Yoshizawa, Osaka, Japan

[73] Assignee: Nippon Sheet Glass Co., Ltd., Osaka, Japan

[21] Appl. No.: 620,555

[22] Filed: Dec. 3, 1990

Related U.S. Application Data

[62] Division of Ser. No. 525,326, May 17, 1990.

[30] Foreign Application Priority Data

| May 18, 1989 | [JP] | Japan | 1-57301 |
| May 18, 1989 | [JP] | Japan | 1-57302 |
| May 19, 1989 | [JP] | Japan | 1-57920 |

[51] Int. Cl.$^5$ ............................................. B60J 1/02
[52] U.S. Cl. ................................. 296/84.1; 296/96.19; 296/180.1
[58] Field of Search .................. 296/84.1, 90, 96.12, 296/96.19, 180.1

[56] References Cited

U.S. PATENT DOCUMENTS

| 1,577,527 | 3/1926 | Hoyt et al. | 296/96.19 |
| 2,924,485 | 2/1960 | Miles | 296/84.1 |
| 3,208,070 | 9/1965 | Boicy | 296/84.1 |
| 3,276,813 | 10/1966 | Shaw, Jr. | 296/96.19 |
| 4,555,434 | 11/1985 | Kunert | 296/96.19 |
| 4,874,654 | 10/1989 | Funaki et al. | 296/84.1 |

Primary Examiner—Robert R. Song
Attorney, Agent, or Firm—Irving M. Weiner; Joseph P. Carrier; Pamela S. Burt

[57] ABSTRACT

A windshield device for an automobile is in the form of a glass sheet having an S-shaped vertical cross section. The windshield device comprises an automobile body having a window frame, and a windshield fixed to the window frame. The windshield has vertical cross sections having profile lines represented by curves, except at opposite sides of the windshield. Each of the curves has a minimal point in an orthogonal coordinate system having a horizontal axis represented by a straight line connecting upper and lower ends of the windshield in the vertical cross section thereof. The minimal point is positioned in a visual area in which a portion of the automobile body is seen through the windshield from a driver's eye point in the automobile.

10 Claims, 6 Drawing Sheets

WINDSHIELD FOR AUTOMOBILES

This is a divisional of application Ser. No. 07/525,326, filed May 17, 1990.

BACKGROUND OF THE INVENTION

1. Field of the Invention

The present invention relates to a windshield for use on automobiles.

2. Description of the Relevant Art

The three-dimensional shape of an automobile windshield has a large effect on aerodynamic characteristics of an automobile body on which the windshield is mounted, and is one of the important factors involved in the styling of the automobile body. There have been developed automobile windshields of various configurations. Recent technology for bending sheet glass makes it possible to produce curved glass sheets which have an S-shaped profile in vertical cross section, i.e., a vertical cross-sectional shape defined by a cubic curve or a curve of higher degree.

A glass sheet of an S-shaped vertical cross section, used as an automobile windshield, is expected to give an improved quality to the style of an automobile body and also to impart aerodynamic improvements to the automobile body. When such an S-shaped glass sheet is fixed as a windshield to a window frame of the automobile body, a region of the windshield near the lower edge thereof, more specifically, a region below a curve which extends through the minimal points of profile lines of the windshield in an orthogonal coordinate system with its horizontal axis represented by a straight line interconnecting the upper and lower edges of the windshield, is inclined so as to lie nearly parallel to the line of sight of the driver of the automobile. Therefore, the optical image of an object as seen by the driver through that region of the windshield is greatly distorted.

SUMMARY OF THE INVENTION

According to the present invention, there is provided a windshield device for an automobile, comprising an automobile body having a window frame, and a windshield fixed to the window frame, the windshield having vertical cross sections having profile lines represented by curves, except at opposite sides of the windshield, each of the curves having a minimal point in an orthogonal coordinate system having a horizontal axis represented by a straight line connecting upper and lower ends of the windshield in the vertical cross section thereof, the minimal point being positioned in a visual area in which a portion of the automobile body is seen through the windshield from a driver's eye point in the automobile.

The portion of the automobile body which is seen through the windshield has nothing to do with the driver's field of view which is required to drive the automobile. Therefore, any visual distortions in the windshield region through which the automobile body portion is viewed do not impair the driver's field of view while the driver is driving the automobile.

Generally, when a glass sheet is bent into a curved windshield, bending stresses tend to be concentrated on regions above opposite ends of a curve which interconnects the opposite sides of the glass sheet at a shortest distance, and hence those regions are liable to get wrinkled. If the curve interconnecting the minimal points extended through those regions, then the glass sheet would be apt to be distorted in those regions.

According to the present invention, the minimal points of the curves are successively interconnected by a curve which is positioned below a curve which interconnects most spaced opposite sides of the windshield on an outer surface thereof at a shortest distance. With this arrangement, curved shapes which give rise to optical distortions will not be imparted to those windshield regions which are liable by nature to be distorted when the glass sheet is bent to shape.

Moreover, the windshield is masked or otherwise treated for reducing transparency thereof in a lower region below a curve successively interconnecting the minimal points of the curves. Since the lower region of the windshield near the lower edge thereof is not part of the driver's field of view and hence is not required to be fully transparent, it may be masked or otherwise reduced in transparency. Further, the masking or reduced transparency of that region is preferable since optical distortions in the region are made less noticeable by the masking and do not annoy the driver while driving the automobile.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
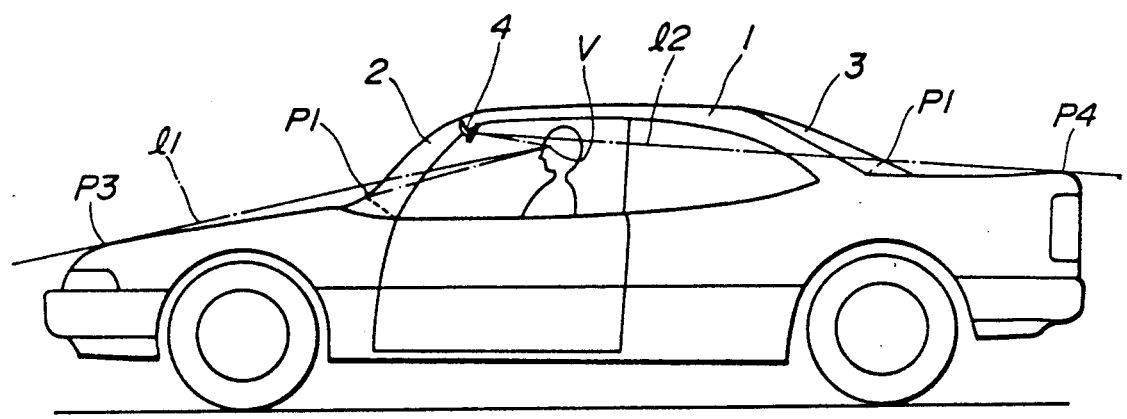
FIG. 1 is a side elevational view of an automobile which has a windshield according to an embodiment of the present invention.

As shown in FIG. 1, an automobile body 1 has a front window frame to which a front windshield 2 is fixed at its peripheral edge by an adhesive and a rear window frame to which a rear windshield 3 is fixed at its peripheral edge by an adhesive.

Preferably, the front windshield 2 comprises a laminated glass sheet and the rear windshield 3 comprises a single tempered glass sheet. The thickness of the glass sheet of the rear windshield 3 or each of the glass layers of the front windshield 2 should preferably 2.5 mm or less in order to avoid wrinkles on the glass sheet.

Figure 3:
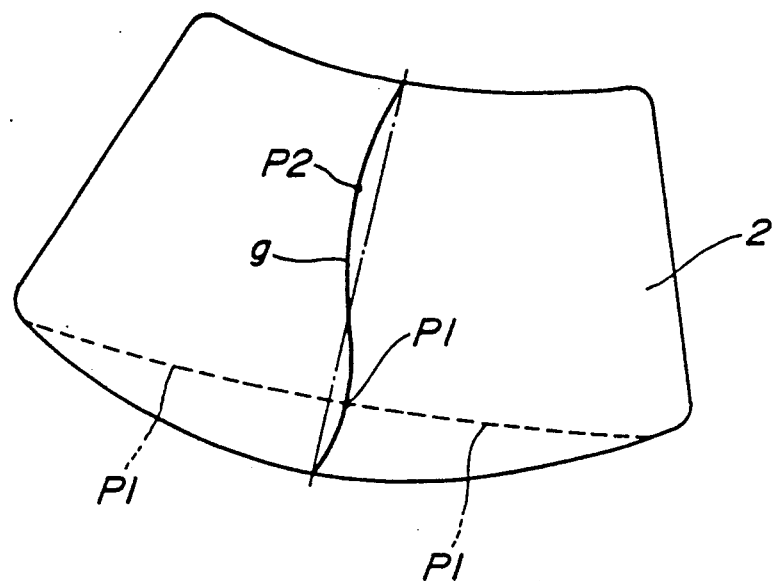
FIG. 3 is a perspective view of the windshield shown in FIG. 1.
Figure 4:
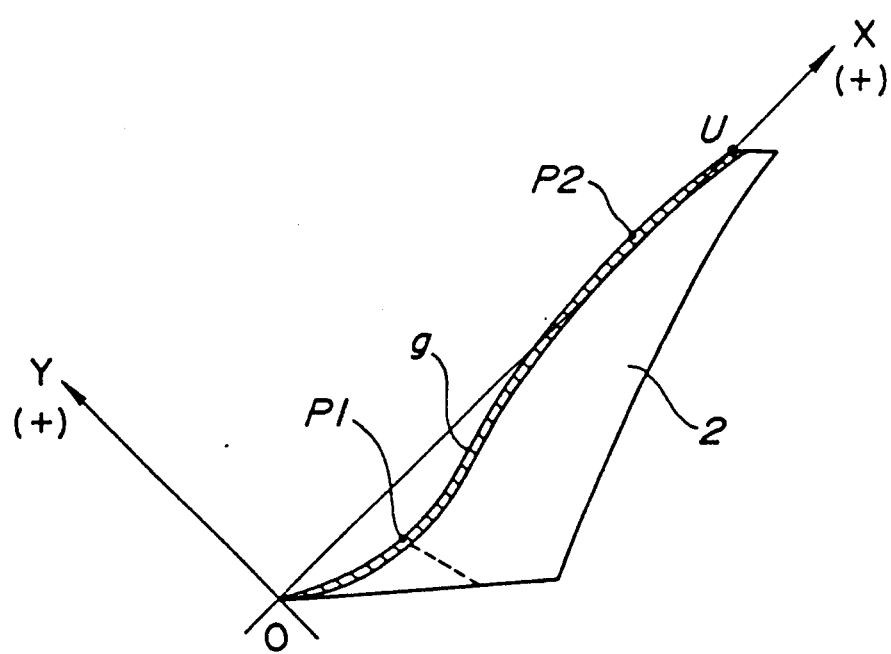
FIG. 4 is a vertical cross-sectional view of the center of the windshield shown in FIG. 3.

As shown in FIGS. 3 and 4, the front windshield 2 has S-shaped vertical cross sections except at regions near the opposite sides thereof. When the front windshield 2 is viewed in side elevation, therefore, its outer surface edge also looks S-shaped. The S-shaped configuration of the front windshield 2 allows the front windshield 2 to smoothly blend into a front portion, i.e., an engine hood, of the automobile body 1, resulting in improved aerodynamic characteristics thereof.

As shown in FIG. 4, an orthogonal coordinate system is established which has a horizontal axis X represented by a straight line interconnecting an upper end U and a lower end O of the windshield 2, and a vertical axis Y represented by a straight line extending perpendicularly to the horizontal axis X at the origin at the lower end O. Each of the S-shaped vertical cross sections of the windshield 2 has a profile line g which is indicated by a cubic curve that has a minimal point P1 and a maximal point P2 in the X-Y orthogonal coordinate system. The gradient of the cubic curve changes from a negative value to a positive value at the minimal point P1 in the X-Y coordinate system, and changes from a positive value to a negative value at the maximal point P2.

Figure 2:
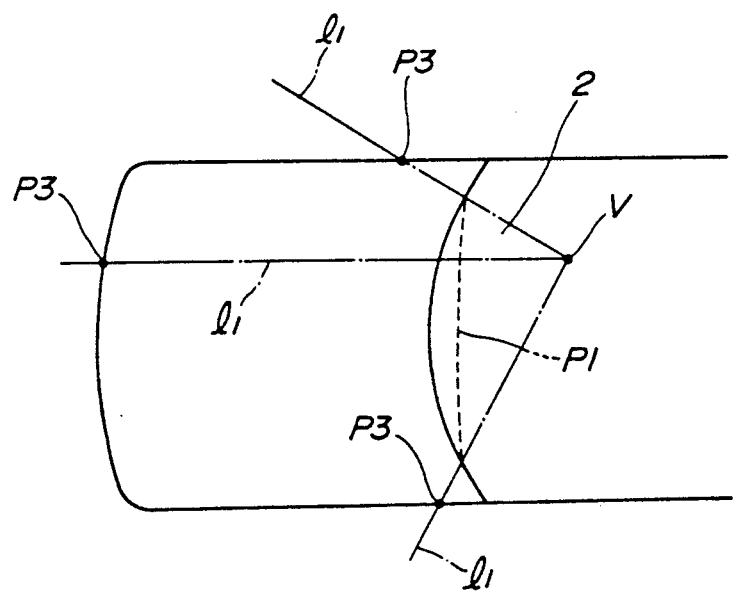
FIG. 2 is a schematic diagram showing a front field of view of the driver of the automobile as viewed in plan.
Figure 5:
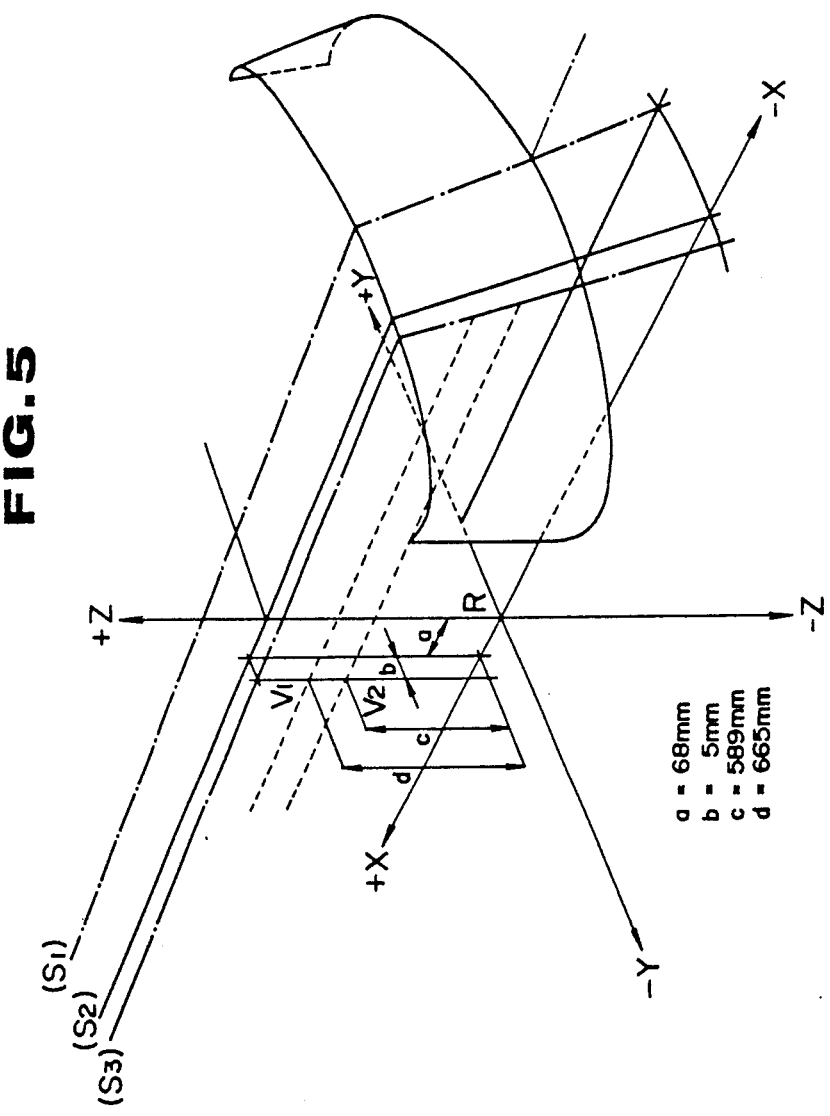
FIG. 5 is a perspective view showing eye points.

As shown in FIGS. 1 and 2, with the windshield 2 fixed to the window frame of the automobile body 1, the minimal point P1 is positioned below a line 11 which extends from an eye point V of the driver tangentially to an upper surface of the engine hood at a point P3. The eye point V may be a point V1 or a point V2 shown in FIG. 5. The positions of the points V1, V2 are indicated in the Table below and in FIG. 5 in relation to a three-dimensional orthogonal coordinate system XYZ with its origin located at a point R. These points V1, V2 are defined in JIS (Japanese Industrial Standard) R3212. The point R in FIG. 5 is a seating reference point, indicates the hip joint of a human model, which is defined by ISO 6549, when the human model is seated on a seat whose seat back angle is 25°.

TABLE

| Eye point V | X | Y | Z |
| --- | --- | --- | --- |
| Point V1 | 68 mm | −5 mm | 665 mm |
| Point V2 | 68 mm | −5 mm | 589 mm |

The rear windshield 3 also has an S-shaped vertical cross section represented by a cubic curve whose minimal point P1 is positioned below a line 12 (FIG. 1) extending from the eye point V through an inside rearview mirror 4 tangentially to an upper surface of the trunk lid at a point P4 at the rear end thereof.

A windshield according to another embodiment of the present invention will be described below with reference to FIGS. 6, 7, and 8a, 8b.

Figure 6:
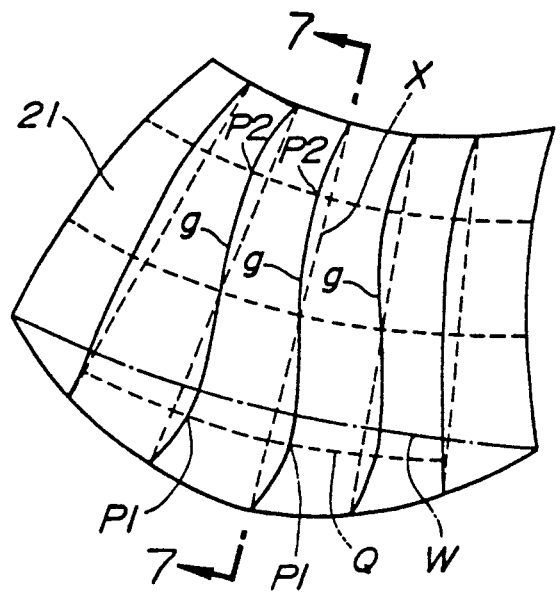
FIG. 6 is a perspective view of a windshield according to another embodiment of the present invention.
Figure 7:
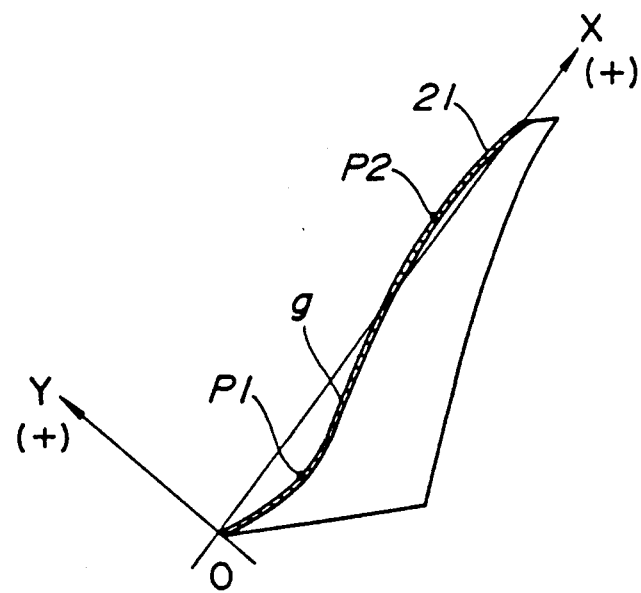
FIG. 7 is a vertical cross-sectional view taken along line 7—7 of FIG. 6.

As shown in FIG. 6, a front windshield 21 has S-shaped vertical cross sections represented by cubic curves, except at regions near the opposite sides thereof, as with the previous embodiment. Each of the cubic curves is indicated by a profile line g which has a minimal point P1 and a maximal point P2 in an orthogonal coordinate system having a horizontal axis X represented by a straight line interconnecting upper and lower ends of the windshield 21 in the vertical cross section and a vertical axis Y represented by a straight line perpendicular to the horizontal axis X.

In this embodiment, a curve Q interconnecting successive minimal points P1 of the plural vertical cross sections of the windshield 21 is positioned downwardly of a curve W which interconnects the most spaced opposite sides of the windshield 21 on its outer surface at a shortest distance. As shown in FIG. 6, the curve Q terminates short of the opposite sides of the windshield 21, i.e., the regions near the opposite sides of the windshield 21 are not S-shaped in vertical cross section.

As with the front windshield 21, a rear windshield (not shown) also has S-shaped vertical cross sections represented by cubic curves. A curve which interconnects successive minimal points of the vertical cross sections of the rear windshield is also positioned below a curve which interconnects the most spaced opposite sides of the windshield on its outer surface at a shortest distance.

Since no minimal points P1 are present at the opposite sides of the windshield, i.e., the opposite sides of the windshield are not S-shaped in vertical cross section, any undue stresses are concentrated at corners (having small radii) of the windshield when it is molded, so that the fabricated windshield is free of distortions. However, the curve Q may extend all the way to the opposite sides of the windshield.

In the process of perfecting the present invention, windshields which are S-shaped when viewed in side elevation were devised.

Figure 8A:
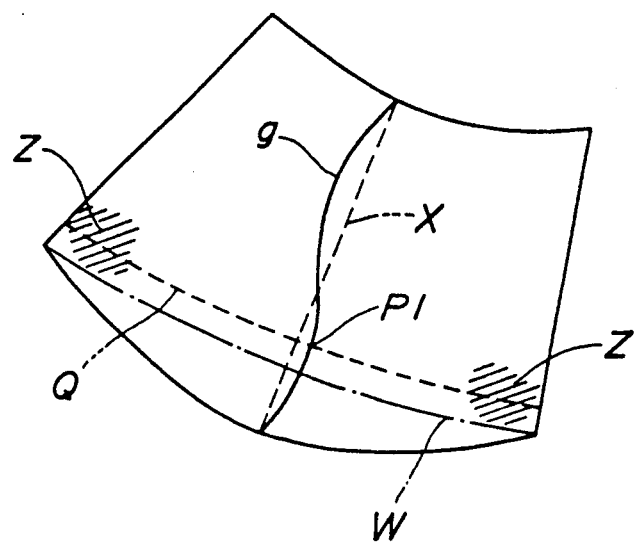
FIGS. 8a and 8b are perspective views of windshields to be compared with the windshield shown in FIGS. 3 and 6.
Figure 8B:
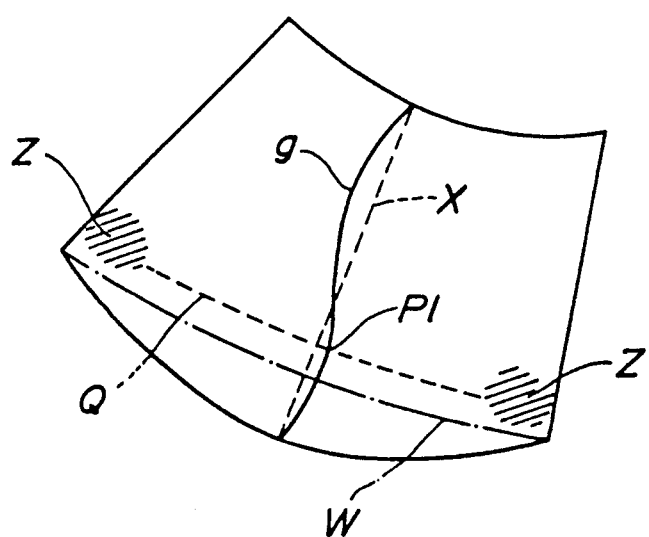

The windshield shown in FIG. 8a has vertical cross sections having profile lines g each represented by a cubic curve. A curve Q which interconnects the minimal points P1 of the profile lines g in an orthogonal coordinate system having a horizontal axis X represented by a straight line connecting upper and lower ends of the windshield, extends parallel to a curve W which interconnects most spaced opposite sides of the windshield at a shortest distance. According to the windshield shown in FIG. 8b, a curve Q interconnecting minimal points P1 terminates short of the opposite sides of the windshield.

Generally, when a glass sheet is bent into a curved configuration, bending stresses tend to be concentrated at regions above opposite ends of a curve which interconnects the most spaced opposite sides of the glass sheet at a shortest distance, and hence those regions are liable to get wrinkled. If the curve Q interconnecting the minimal points P1 on a glass sheet having an S-shaped vertical cross section extended through those regions, which are indicated by Z in FIG. 8, then the glass sheet would be apt to be distorted in those regions Z.

A windshield in accordance with still another embodiment of the present invention will be described below with reference to FIGS. 9 through 12.

Figure 9:
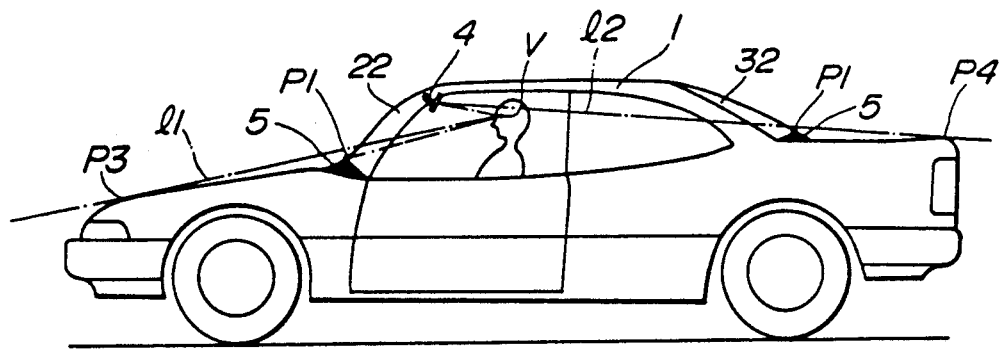
FIG. 9 is a side elevational view of an automobile which is equipped with a windshield according to still another embodiment of the present invention.
Figure 11:
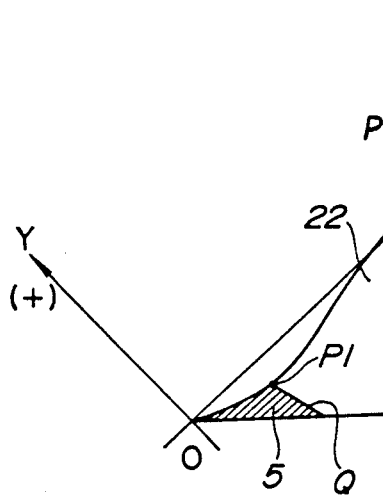
FIG. 11 is a side elevational view of the windshield shown in FIG. 10.
Figure 10:
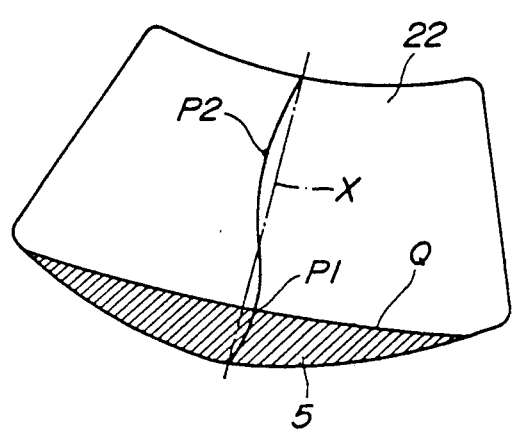
FIG. 10 is a perspective view of the windshield shown in FIG. 9.

As shown in FIG. 9, a front windshield 22 is fixed to a front window frame of an automobile body 1 by an adhesive, and a rear windshield 32 is fixed to a rear window frame of the automobile body 1 by an adhesive. Each of the front and rear windshields 22, 32 has vertical cross sections represented by S-shaped profile lines, except at opposite sides of the windshield.

Figure 12:
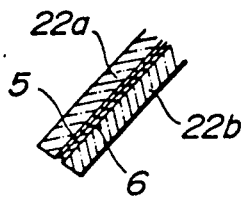
FIG. 12 is an enlarged fragmentary cross-sectional view of a lower edge portion of the windshield shown in FIGS. 10 and 11.

As illustrated in FIG. 12, the front windshield 22 comprises an outer glass sheet layer 22a and an inner glass sheet layer 22b which are joined to each other by an intermediate film 6 of polyvinyl butyral or the like which is interposed therebetween. When viewed in side elevation, the windshield has an outer surface edge represented by an S-shaped cubic curve having a minimal point P1 and a maximal point P2 in an orthogonal coordinate system having a horizontal axis X represented by a straight line connecting upper and lower ends of the windshield, and a vertical axis Y perpendicular to the horizontal axis X.

In this embodiment, the windshield has a colored layer 5 of ceramic paste below a curve Q which interconnects minimal points P1 of plural S-shaped cubic curves of the windshield. The ceramic colored layer 5 serves to reduce the transparency of the windshield in the region below the curve Q.

As shown in FIG. 12, the ceramic colored layer 5 is attached to an inner surface of the outer glass sheet layer 22a. However, the ceramic colored layer 5 may be applied to an outer surface of the outer glass sheet layer 22a, or an outer or inner surface of the inner glass sheet layer 22b. Instead of the ceramic colored layer 5, a colored tape may be applied or sandwiched between the inner and outer glass sheets 22a, 22b, or a certain region of the intermediate film 6 may be colored, or a dot-matrix pattern may be printed in the region below the curve Q, thereby masking the region below the curve Q for reduced transparency. Similarly, a ceramic colored layer or a certain transparency-reducing masking treatment may be applied to the rear windshield 32 in a region below a curve interconnecting minimal point P1 thereon.

With the present invention, as described above, the windshield is effective in improving the aerodynamic properties of an automobile body, and gives the driver a better field of view by positioning the optical-distortion inducing windshield region below the minimal points of the S-shaped cubic curves of the windshield. Further, the optical-distortion inducing region is positioned in a visual area in which the image of an automobile body portion, e.g., the engine hood or trunk lid, is seen through the windshield, and which has nothing to do with the driver's field of view required for driving.

When the S-shaped windshield of the present invention is produced, no undue stresses are concentrated at the corners of the windshield at its opposite sides, and hence the windshield is prevented from being wrinkled when it is bent to shape.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. A windshield for an automobile, having vertical cross sections having profile lines represented by S-shaped curves, except at opposite sides of the windshield, each of said curves having a minimal point in an orthogonal coordinate system having a horizontal axis represented by a straight line connecting upper and lower ends of the windshield in a vertical cross section thereof, the minimal points of said curves being successively interconnected by a curve which is positioned below a curve which interconnects most spaced opposite sides of the windshield on an outer surface thereof at a shortest distance.

2. A windshield for an automobile, having vertical cross sections having profile lines represented by S-shaped curves, except at opposite sides of the windshield, each of said curves having a minimal point in an orthogonal coordinate system having a horizontal axis represented by a straight line connecting upper and lower ends of the windshield in a vertical cross section thereof, said windshield being masked to reduce transparency thereof in a region below a curve successively interconnecting the minimal points of said curves.

3. A windshield according to claim 1, wherein said windshield is masked to reduce transparency thereof in a region below said curve successively interconnecting the minimal points of said S-shaped curves.

4. A windshield according to claim 1, wherein each of said profile lines is represented by a cubic curve in said orthogonal coordinate system.

5. A windshield according to claim 1, wherein said windshield comprises a laminated glass sheet.

6. A windshield according to claim 1, wherein said windshield comprises a single tempered glass sheet.

7. A windshield according to claim 2, wherein said curve interconnecting the minimal points of said S-shaped curves is positioned below a curve which interconnects most spaced opposite sides of the windshield on an outer surface thereof at a shortest distance.

8. A windshield according to claim 2, wherein each of said profile lines is represented by a cubic curve in said orthogonal coordinate system.

9. A windshield according to claim 2, wherein said windshield comprises a laminated glass sheet.

10. A windshield according to claim 2, wherein said windshield comprises a single tempered glass sheet.

* * * * *